(12) United States Patent
Norberg et al.

(10) Patent No.: US 7,516,284 B2
(45) Date of Patent: Apr. 7, 2009

(54) METHOD FOR REMOVING ALIAS ADDRESSES FROM AN ALIAS ADDRESS POOL

(75) Inventors: Craig Donald Norberg, Beacon, NY (US); Scott Brady Compton, Hyde Park, NY (US); Dale Francis Riedy, Jr., Poughkeepsie, NY (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 11/469,391

(22) Filed: Aug. 31, 2006

(65) Prior Publication Data

US 2008/0059729 A1 Mar. 6, 2008

(51) Int. Cl.
*G06F 12/00* (2006.01)
(52) U.S. Cl. .......................................... 711/159; 710/9
(58) Field of Classification Search ................. 711/159; 710/9
See application file for complete search history.

(56) References Cited

U.S. PATENT DOCUMENTS

| | | | |
|---|---|---|---|
| 5,093,912 A | | 3/1992 | Dong et al. |
| 5,357,152 A | | 10/1994 | Jennings, III et al. |
| 5,530,897 A | * | 6/1996 | Meritt ........................... 710/9 |
| 6,167,459 A | | 12/2000 | Beardsley et al. |
| 6,170,023 B1 | | 1/2001 | Beardsley et al. |
| 6,185,638 B1 | | 2/2001 | Beardsley et al. |
| 2003/0007486 A1 | * | 1/2003 | March et al. ................. 370/389 |
| 2005/0114591 A1 | | 5/2005 | Coronado et al. |
| 2007/0136552 A1 | * | 6/2007 | Yudenfriend et al. ........ 711/201 |

FOREIGN PATENT DOCUMENTS

| | | |
|---|---|---|
| EP | 0756228 A1 | 1/1997 |
| JP | 2001312454 A | 11/2001 |
| JP | 2005190464 A | 7/2005 |

OTHER PUBLICATIONS

U.S. Appl. No. 11/299,089, entitled "Assigning Alias Addresses to Base Addresses", filed Dec. 8, 2005, by inventors H.M. Yudenfriend, M.J. Kalos, R.A. Ripberger, K.M. Trowell, D.F. Riedy, Jr., and J.A. Coronado.

* cited by examiner

*Primary Examiner*—Kevin Ellis
*Assistant Examiner*—Hashem Farrokh
(74) *Attorney, Agent, or Firm*—David W. Victor; Konrad Raynes & Victor LLP (57) ABSTRACT

Provided is a method for removing alias addresses from an alias address pool. A plurality of alias addresses are assigned to an alias address pool, wherein the alias addresses in the alias address pool are capable of being dynamically assigned to a device to service I/O requests to the device. An operation is initiated by a process to remove a specified alias address from the alias address pool. An indicator is set to prevent additional processes from removing one alias address from the alias address pool in response to initiating the operation. The specified alias address is removed from the alias address pool.

8 Claims, 5 Drawing Sheets

FIG. 1

Host/Processing System UCB Info

FIG. 2
PRIOR ART

Control Unit Address Information

FIG. 3
PRIOR ART

Control Unit Alias Storage Pool

METHOD FOR REMOVING ALIAS ADDRESSES FROM AN ALIAS ADDRESS POOL

BACKGROUND

1. Field

The present invention relates to a method, system, and program for removing alias addresses from an alias address pool.

2. Description of the Related Art

In certain computing environments, multiple host systems may communicate with multiple control units (CUs) (also known as storage controllers, storage subsystems, enterprise storage servers, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS is configured to include multiple volumes.

The host system may include a channel subsystem that maintains information to access volumes in an LSS from the control unit. The channel subsystem includes subchannels, which provides state tracking for the execution of the I/O operations for the channel subsystem and provides information on paths connecting the host to a volume in an LSS. The host operating system maintains a unit control block (UCB) providing information on a base unit address assigned to one volume and the subchannel that the channel subsystem uses to access the volume on the base device. The channel subsystem is aware of individual subchannels and the paths they have. The customer initially assigns aliases to bases via external tools to the CU. The operating system can dynamically change the binding of aliases to bases given changes in the workload requirements. Further, the control unit may assign alias addresses to the base addresses for volumes, where the alias addresses are used to allow concurrent I/O requests to be directed to the same volume. The UCB for a base volume maintains information on the alias addresses assigned to that volume. The host processes the information in the UCB to address an I/O operation to a volume. In particular, the host initiates an I/O operation toward a volume by initiating a channel program which consists of a series of I/O instructions, such as a chain of channel command word (CCW) commands, at the subchannel.

The control unit maintains a different view of the system. The control unit is provided a base unit address for each device (volume) and zero or more alias unit addresses for each base unit address. After assigning a base address to each volume (device), the remaining addresses can be allocated as alias addresses to the base addresses. The control unit uses the unit addresses to physically access the volumes.

An I/O operation or chain of CCW commands can be simultaneously executed toward the same logical volume using the different base and alias unit addresses for the logical volume. In this way, the executed CCW commands are all directed toward the same logical volume using different addresses, wherein each address uses one of multiple channel paths to reach a single logical volume. This allows a single host to concurrently execute multiple I/O operations against a single volume. The number of aliases provided for a base may be set according to the size of the volume and the number of concurrent users. In certain cases, only a few aliases may be needed to accommodate network traffic for a particular base address for a volume. Further, the number of aliases associated with a logical volume may be dynamically changed by the Work Load Manager (WLM) based on the goals for the work load.

The host first attempts to access a volume (I/O device) through the base UCB for the volume. If the base UCB is unavailable, i.e., concurrently servicing another I/O operation, then the host may use one of the available alias UCBs assigned to that base UCB to concurrently access the volume. The host system then performs the I/O operations through the subchannel associated with the UCB and the channel paths provided for that subchannel.

In current systems, the alias addresses available for assignment to a base address for a volume in an LSS are maintained in an alias address pool. The pool comprises alias address control blocks, where each alias address control block includes a pointer to a next alias address control block in the pool and the last alias address control block includes a null pointer. An LSS control block maintains a pointer to the first alias address control block in the pool. Alias addresses are removed or added to the pool by removing or adding an alias address control block to the first control block in the pool of linked control blocks, which is the control block identified by the pointer in the LSS control block.

In a multiple processor (CPU) host system with heavy demand for alias usage, there may be constant change to the queue representing the pool of free aliases. Each CPU may perform I/O related work that utilizes alias addresses, which may involve obtaining/returning an alias from/to the pool. Alterations to the free alias pool may be serialized to ensure queue integrity. Access to remove or add an alias address to the first entry of the alias address pool can be serialized by using a single spin lock or a compare double swap technique. A spin lock may not be chosen due to potential conflicts with other processes using spin locks. Instead, a compare double swap serialization may be used. The compare and double swap serialization technique may provide serialization when the queue is used in a last-in, first-out (LIFO) manner.

According to the compare double swap technique, when a process seeks to add or remove an alias address control block to the first entry in the pool, the host operating system makes a copy of the pointer to the first alias address control block in the pool and a counter indicating a number of processes pending completed against the pool to remove or add alias addresses. When the process is ready to remove or add an alias address control block to the first entry in the pool, the copy of the pointer and counter is compared with the current actual values maintained in the LSS control block. If the copy matches the actual values, then the host operating system proceeds with the addition or removal of the first control block entry in the storage pool. If the copy does not match the actual values, then the compare and double swap process is performed again by making a new copy of the actual counter and pointer values in the LSS control block and then again performing the check before attempting the change to the first control block entry in the pool.

SUMMARY

Provided are a method, system, and article of manufacture for removing alias addresses from an alias address pool. A plurality of alias addresses are assigned to an alias address pool, wherein the alias addresses in the alias address pool are capable of being dynamically assigned to a device to service I/O requests to the device. An operation is initiated by a process to remove a specified alias address from the alias address pool. An indicator is set to prevent additional processes from removing one alias address from the alias address pool in response to initiating the operation. The specified alias address is removed from the alias address pool.

DETAILED DESCRIPTION

Figure 1:
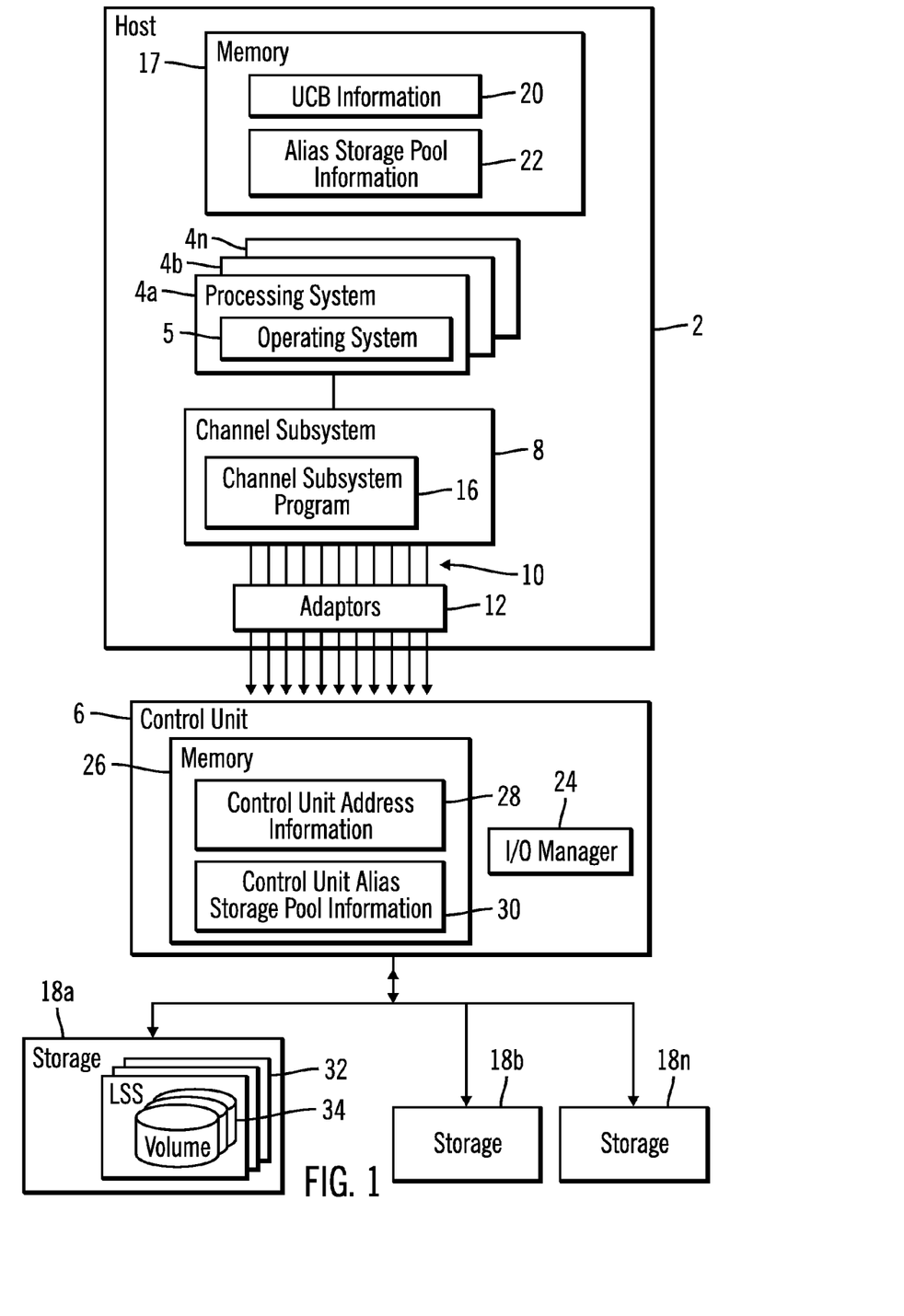
FIG. 1 illustrates an embodiment of a computing environment.

FIG. 1 illustrates a computing environment in which described embodiments are implemented. One or more hosts 2 (only one is shown) include one or more processing systems 4a, 4b . . . 4n that communicate Input/Output (I/O) requests to a control unit 6 through a channel subsystem 8 that provides a plurality of logical paths to the control unit 6. Each processing system 4a, 4b . . . 4n includes an operating system 5 to manage path related operations. The channel subsystem 8 manages logical paths 10 extending through adaptors 12. An adaptor provides the physical layer through which logical paths 10 extend to the control unit 6 or multiple control units through a switch (not shown). The operating system 5 may further associate multiple logical paths 10 with a path group, where all the paths in a path group may be used by one processing system 4a, 4b . . . 4n to communicate with the control unit 6. A path group used by one processing system 4a, 4b . . . 4n may be identified by a path group identifier (PGID). The operating system 5 may issue an I/O command (such as a Set Path Group ID CCW) to each path for the device using a world wide unique identifier (PGID). The control unit 6 creates a path group from the set of paths for a device that have the same identifier.

Each processing system 4a, 4b . . . 4n may comprise a central processing unit (CPU) executing programs, including the operating system 5 and channel subsystem 8 code. Alternatively, each processing system 4a, 4b . . . 4n may comprise one of multiple logical partitions (LPARs) that each operate as independent systems, executing their own operating system 5 and may share channel subsystem 8 code. In further embodiments, each processing system may comprise a logical partition of a processor. In this way, one or more processors in the host 2 may implement multiple logical partitions (LPARs). Multiple processing systems 4a, 4b . . . 4n may share a single logical channel subsystem 16 or different processing systems 4a, 4b . . . 4n may use different logical channel subsystems. Details of a channel subsystem implementing logical paths is described in the publication "z/Architecture: Reference Summary", IBM document no. SA22-7871-02 (Copyright IBM, September 2005).

The channel subsystem 8 includes a channel subsystem program 16 to perform the operations to communicate I/O requests from the processing systems 4a, 4b . . . 4n to the control unit 6. The operating system 5 uses Unit Control Blocks (UCBs) and manages I/O requests. The channel subsystem program 16 obtains the I/O request from the channel subsystem 8. A memory 17, comprised of one or more memory devices, includes information used by the channel subsystem program 16 to manage I/O requests. Each processing system 4a, 4b . . . 4n maintains its own UCB and alias storage pool information providing information on the UCB chains for each processing system 4a, 4b . . . 4n. Different processing systems 4a, 4b . . . 4n may have different UCB chains having different alias addresses assigned to the base addresses for a particular processing system.

The host memory 17 further includes alias storage pool information 22 providing information on the assignment of available alias addresses for different logical subsystems (LSS) for the processing systems 4a, 4b . . . 4n, such that different processing systems 4a, 4b . . . 4n may be using and have available different alias addresses. Further, the different processing systems 4a, 4b . . . 4n may have available for use the same alias addresses, but use them differently, i.e., assign them in different configurations to the volumes and alias storage pool. In one embodiment, the memory 17 may maintain the UCB information 20 and alias storage pool information 22 for all processing systems 4a, 4b . . . 4n and LSSs, which is shared for all processing system operations at the same time. In a further embodiment, each processing system may maintain in its own memory the UCB information 20 and alias storage pool information 22 for that processing system 4a, 4b . . . 4n.

The control unit 6 manages requests from the processing systems 4a, 4b . . . 4n to access storage systems 18a, 18b . . . 18n, such as tracks, partitions, logical devices, logical volumes, logical unit numbers (LUNs), logical subsystems (LSS) or other logical or physical units of storage. Storage 18a shows a configuration including one or more LSSs 32, where one or more volumes 34 are configured in each LSS 32. The volumes may extend across multiple storage devices. The term "device" refers to any physical or logical data storage unit, such as a physical track, LSS, partition, logical volume, volume, etc. The control unit 6 includes an I/O manager program 24 to process I/O requests to the storages 18a, 18b . . . 18n and logical and physical components configured therein, e.g., volumes, LSSs, etc. The control unit 6 has a control unit memory 26, comprised of one or more memory devices, in which the I/O manager 24 maintains control unit address information 28 having the assignment of base and alias addresses for defined storage units, such as volumes within a logical subsystem (LSS). The memory 26 further includes control unit alias storage pool information 30 having information on the alias addresses available for the processing systems 4a, 4b . . . 4n.

The hosts 2 may comprise computational devices known in the art, such as a workstation, mainframe, server, etc. The control unit 6 may comprise a storage subsystem or server, such as an enterprise storage server, storage controller, etc., or other device used to manage I/O requests to attached volumes. The storages 18a, 18b . . . 18n may comprise storage devices known in the art, such as interconnected hard disk drives (e.g., configured as a DASD, RAID, JBOD, virtualized devices, etc.), magnetic tape, electronic memory, flash memory, optical disk, etc. The host 2 may communicate with the control unit 6 over the logical paths 10, which may extend through a network, such as a Local Area Network (LAN), Storage Area Network (SAN), Wide Area Network (WAN), peer-to-peer network, wireless network, etc. Alternatively, the host 2 may communicate with the storage controller 6 over a bus interface, such as a Peripheral Component Interconnect (PCI) bus or serial interface.

Figure 2:
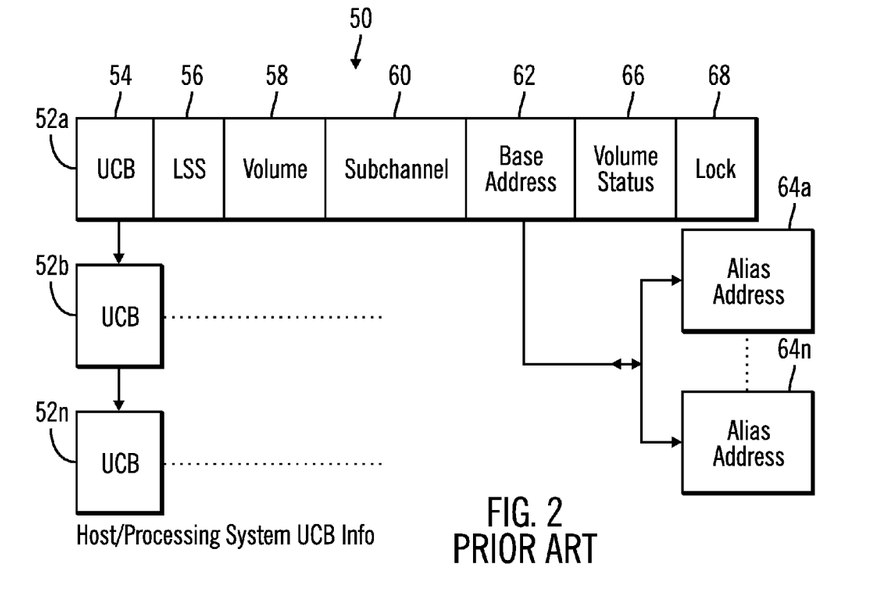
FIGS. 2 and 4 illustrate embodiments of information a host maintains to access volumes known in the prior art.

FIG. 2 illustrates host/processing system UCB information 50 known in the prior art having information on the assignment of base and alias addresses to the volumes for one processing system 4a, 4b . . . 4n and LSS 32. An instance of the information 50 would be maintained for each separate processing system 4a, 4b . . . 4n and LSS 32 pair in the host 2.

The instances of the UCB information 50 comprise the UCB information 20. The information 50 includes UCB entries 52a, 52b . . . 52n for one processing system 4a, 4b . . . 4n, which includes for each UCB in the chain the following information: a UCB identifier 54 of a UCB providing information to access one volume configured in the storages 18a, 18b . . . 18; a logical subsystem (LSS) 56 identifying an LSS 32 in which the volume 34 is configured; a volume 58 in the LSS 32 identified in field 56 for which the information is provided; a subchannel 60 of the channel subsystem 8 comprising a subchannel number, index or pointer providing information on the volume; a base address 62 for the subchannel; and one or more alias addresses 64a . . . 64n used to additionally address the volume (if any have been assigned); and volume status 66 providing information on the status of the volume. In certain embodiments, alias addresses are only associated with a specific base address 62 when an I/O operation is active for that base (volume). Otherwise the aliases reside in a pool of available aliases not associated with any specific base (volume).

In one embodiment, alias addresses may be initially associated with bases in the storage subsystem (LSS) of the control unit 6. If the storage subsystem supports the alias address pooling, then the operating system 5 issues a "set subsystem characteristics command" to tell the control unit 6 to operate in a mode where alias addresses are pooled and assigned only when needed. This command causes the alias addresses to no longer be associated with a specific base address 62 for that processing system 4a, 4b . . . 4n. Each operating system in a processing system 4a, 4b . . . 4n can change their alias addressing modes independently. At this point, the alias addresses are available to be assigned to a base address 62 as I/O operations are started, and returned to the pool as operations complete. Likewise, the devices in the LSS can be switched by the customer back to the original mode of operation where aliases are statically assigned to base addresses. In this way, the operating system may transition in and out of the mode where alias addresses are dynamically assigned and used to a mode where they are statically assigned and used.

In the illustrated embodiment of FIG. 2, the UCB information 50 provides a chain of UCBs 52a, 52b . . . 52n for one processing system 4a, 4b . . . 4n and one LSS 32 configured in the storages 18a, 18b . . . 18n, where each UCB 52a, 52b . . . 52n includes information for one volume. In alternative embodiments, the UCB information 50 may include different information for different storage systems and environments to provide information on base and alias addresses assigned to volumes configured in the storages 18a, 18b . . . 18n. Further, if the system is not implementing channel subsystem technology, then information on the subchannel, such as field 60 may not be included.

The UCB control block 50 further includes a lock 68 serializing alter access to that UCB which is a host system requirement when making changes to the base UCB such as binding or unbinding an alias. The lock 68 may comprise a spin lock. There may be 64K or more of such spin locks in a host system.

Figure 3:
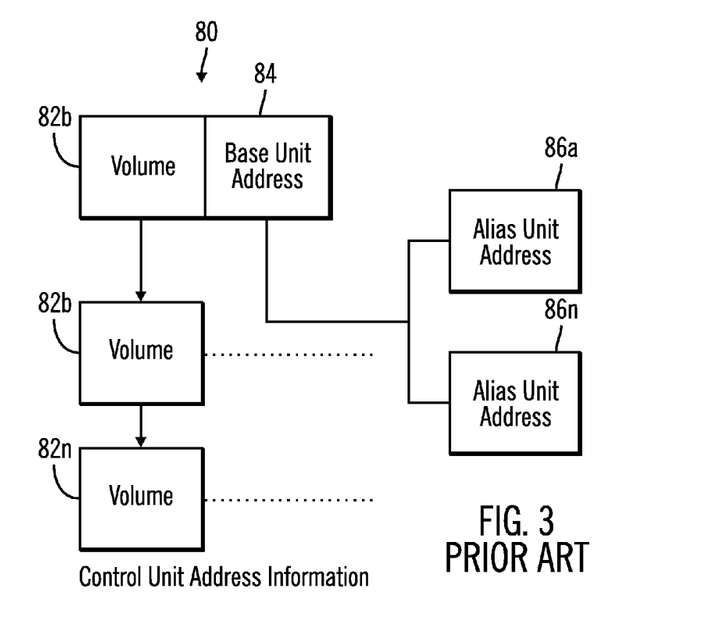
FIGS. 3 and 5 illustrate embodiments of information a control unit maintains to allow a host to access volumes managed by the control unit. The information of FIG. 3 is known in the prior art.

FIG. 3 illustrates an embodiment of control unit address information 80 having information known in the prior art on the assignment of base and alias addresses for one processing system 4a, 4b . . . 4n and logical subsystem 32 configured in the storages 18a, 18b . . . 18n. An instance of the information 50 would be maintained for each separate processing system 4a, 4b . . . 4n and each logical subsystem (LSS) that the processing system 4a, 4b . . . 4n may access. The address information 80 includes an entry 82a . . . 82n for each volume 34 configured in the logical subsystem (LSS) 32 for which the information 80 is maintained. The instances of the control unit address information 80 comprise the control unit address information 28. Each entry 82a, 82b . . . 82n (FIG. 3) includes: a volume identifier 84; the base address 86 assigned to the volume; and zero or more alias addresses 86a . . . 86n that may be assigned to the base address 84 to additionally use to access the volume.

Figure 4:
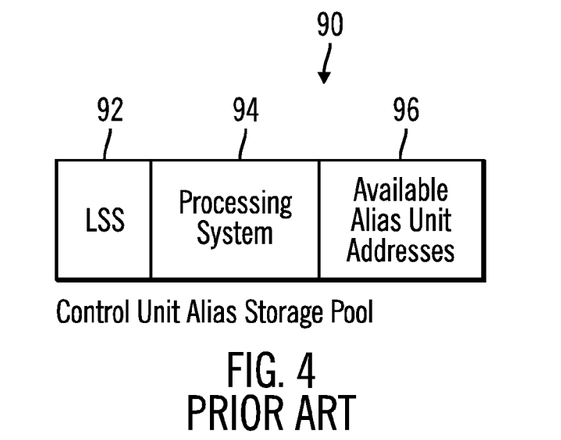

FIG. 4 illustrates an embodiment of control unit storage pool information 90, known in the prior art, maintained for one logical subsystem (LSS) 32 and one processing system 4a, 4b . . . 4n. The instance of the control unit system storage pool information 90 includes, for one processing system 4a, 4b . . . 4n and logical subsystem 32, the logical subsystem (LSS) 92 and the processing system 94 to which the information applies and the available alias addresses 96 that may be assigned to volumes 34 configured within the LSS 92 for the processing system 94. In alternative embodiments, the storage pool information 90 may include different information for different storage systems and environments to provide information on base and alias addresses assigned to volumes configured in the storages 18a, 18b . . . 18n.

Figure 5:
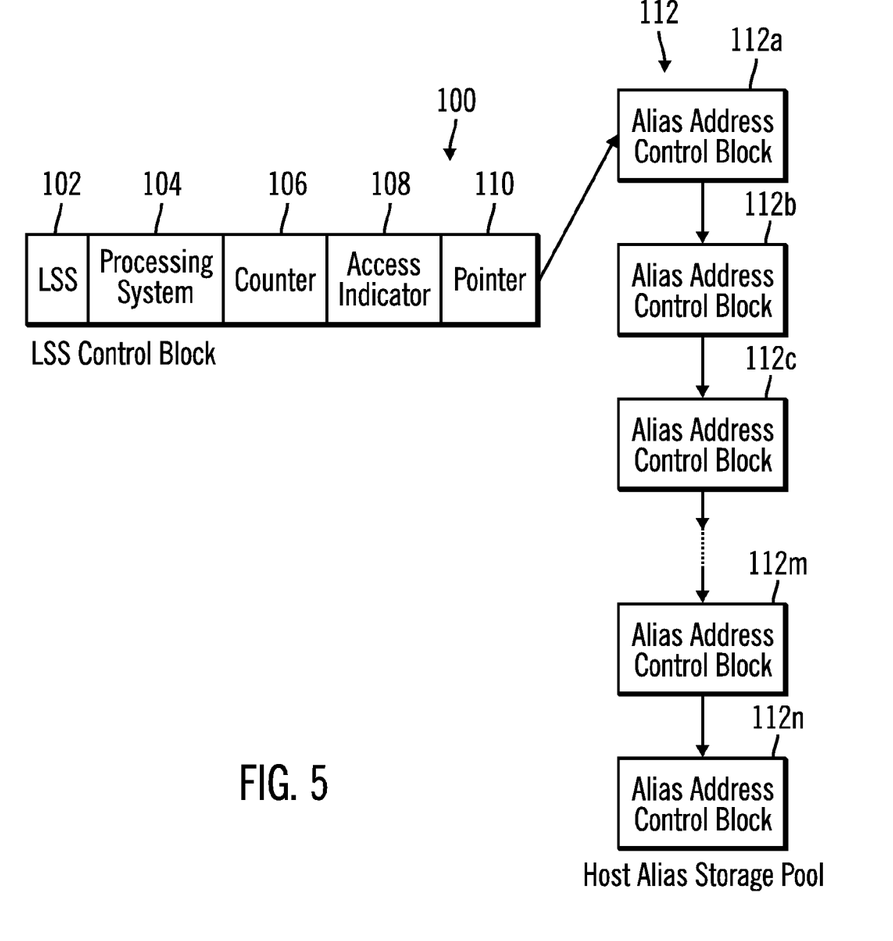

FIG. 5 illustrates an embodiment of an LSS control block 100 maintained by the host 2 in the alias storage pool information 22 that provides the storage pool information 22 for the alias addresses that may be used by the processing systems 4a . . . 4n in the host 2 for the LSS. The LSS control block 100 includes an LSS field 102 identifying the LSS for which the information applies alias information for one LSS and a processing system 104 field identifying the processing system 4a, 4b . . . 4n for which the information applies. A counter 106 identifies a number of processes pending to perform having completed an addition or removal to the available alias addresses. An access indicator 108 indicates whether a process may proceed to remove an alias address from the alias address storage pool, represented by control block 100. A pointer 110 identifies a first alias address UCB 112a in the alias address storage pool, and each alias address UCB 112a, 112b . . . 112m has a pointer to a next alias address in the storage pool, where the last alias address UCB 112n has a null pointer not pointing to any next alias address UCB. The alias address UCBs 112a . . . 112n comprise an alias address pool 112 of alias address that may be assigned to volumes in the LSS 102 for the processing system 104.

Figure 6:
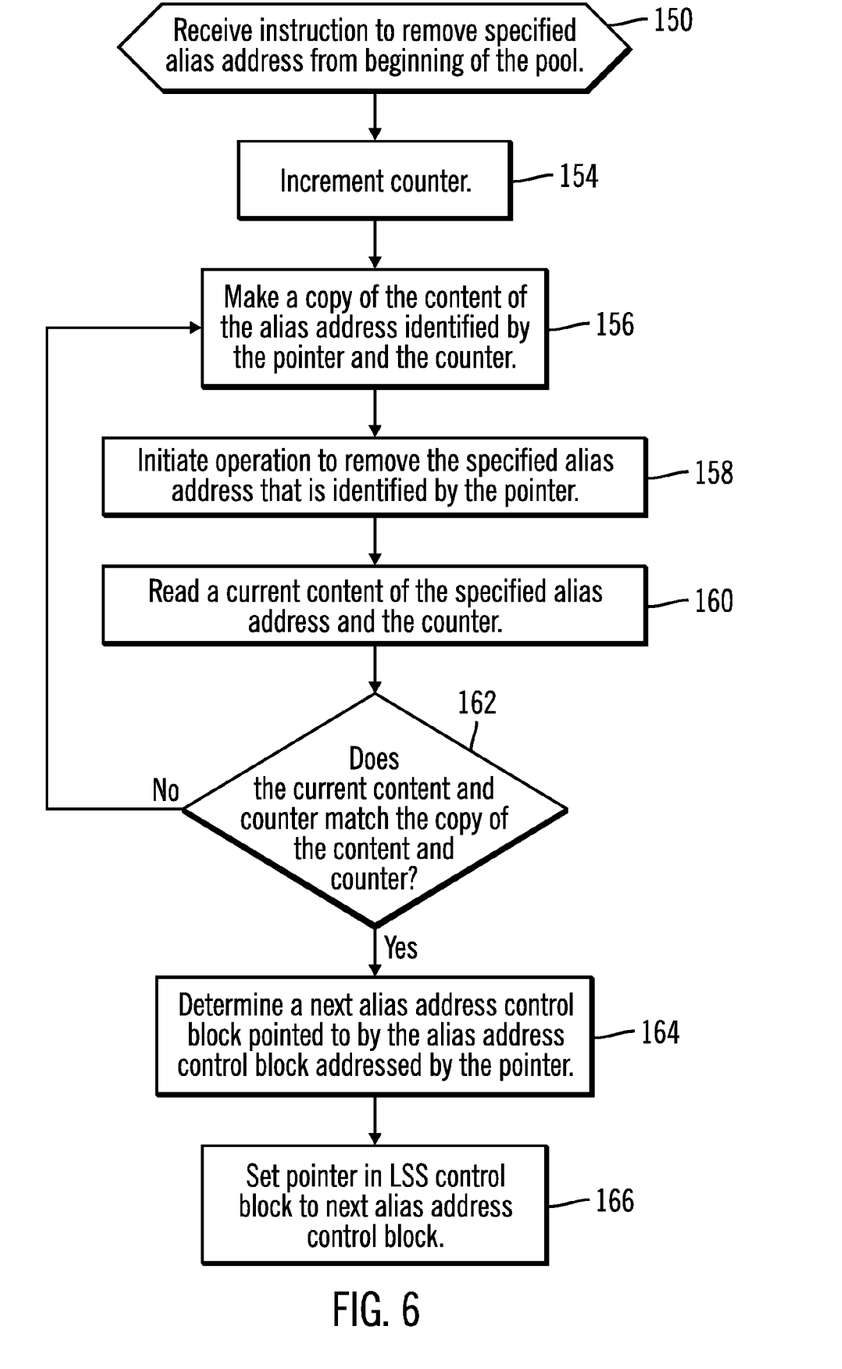
FIGS. 6 and 7 illustrate an embodiment of operations to process a request to remove an alias address control block from the alias address pool.

FIG. 6 illustrates an embodiment of operations to obtain a first alias address 112a in the pool 112. Control begins at block 150 upon the operating system 5 (FIG. 1) receiving from a process executing in one of the processing systems 4a, 4b . . . 4n a command or request to remove the alias address 112a from the beginning (first entry) of the alias address pool 112. The operating system 5 increments (or decrements) (at block 154) the counter 106 to indicate another process pending completed to remove or add an alias address with respect to the pool 112. In one embodiment, a compare double swap technique is used to remove the first alias address 112a from the alias address pool 112 (FIG. 5). To perform the compare double swap, a copy is made (at block 156) of the content of the alias address UCB 112a identified by the pointer 110 and the counter 106. Upon initiating (at block 158) an operation to remove the first alias address 112a that is identified by the pointer 110, the operating system 5 reads (at block 160) a current content of the alias address UCB and the counter and if the copied and read information match (at block 162), then a determination is made (at block 164) of a next alias address control block pointed to by the alias address control block 112a addressed by the pointer 110, i.e., the second alias address control block 112b. The pointer 110 in the LSS control block 100 is set (at block 166) to the next (or second) alias address control block 112b. If the copied and read information do not match (from the no branch of block 162), then control proceeds back to block 156.

In the embodiment of FIG. 6, the compare-and-double-swap process may require the holding of the lock 68 (FIG. 2) to exploit the system requirement that the processor be serialized on the base UCB. The lock 68 may also be held to disable I/O and external interrupts to ensure that when each processor enables for at least an instant, no processor will still be accessing the pool 112.

A process to add an alias to the beginning of the alias pool may use the compare-and-double swap technique described with respect to FIG. 6, except that instead of performing the operations at blocks 164 and 166, the process may set the pointer 110 in the LSS control block 100 to point to the alias address control block to add and then adjust the alias address control block that was added to point to the alias address control block that was previously addressed by the pointer 110, i.e., the previous first alias control block 112a in the pool 112.

Figure 7:
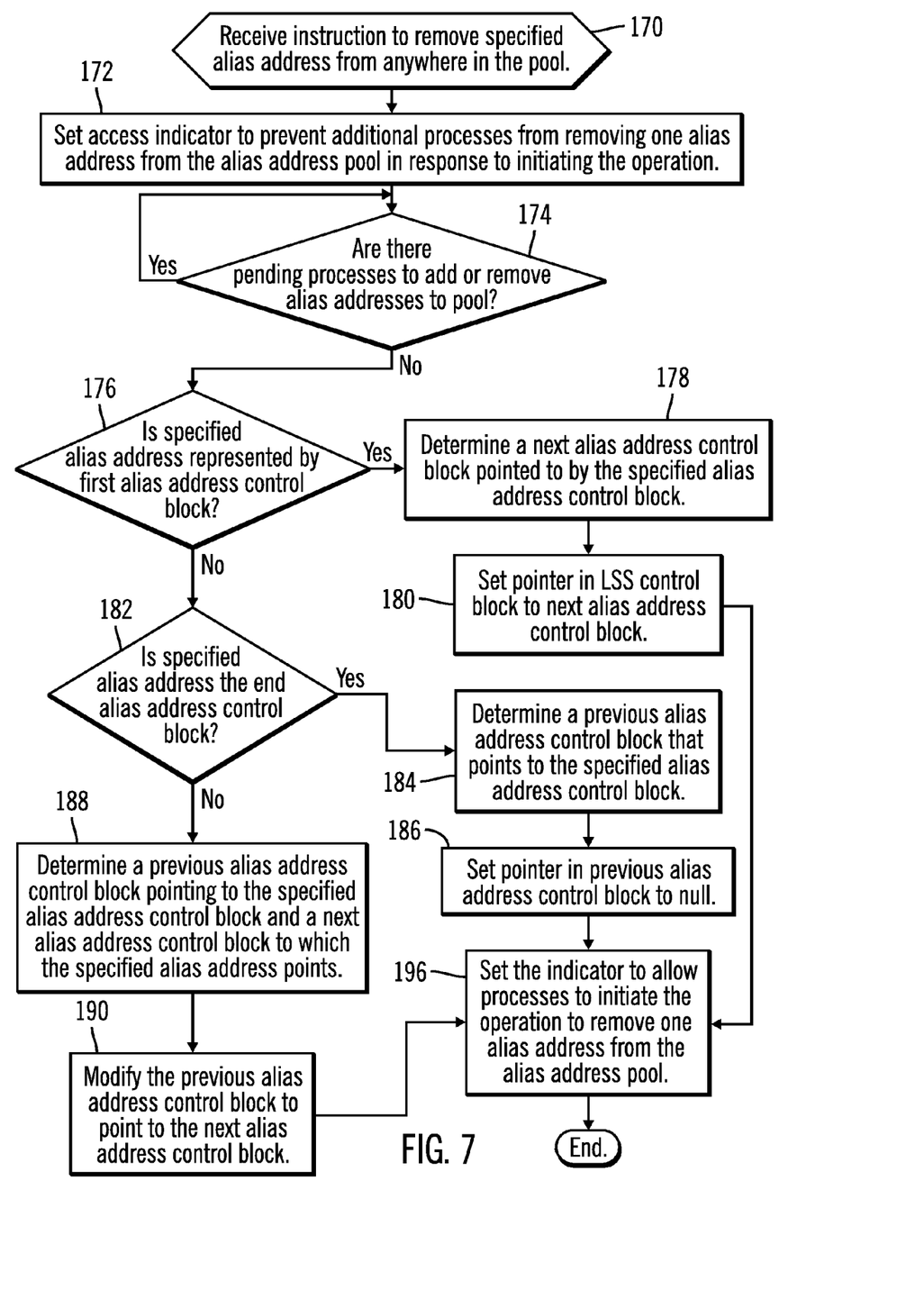

FIG. 7 illustrates an embodiment of operations to remove a specific alias from anywhere in the alias pool 112. Upon receiving (at block 170) the instruction to remove the specified alias from anywhere in the pool 112, which also means that interrupts may be enabled for the process requesting the removal, the access indicator 108 is set (at block 172) to prevent additional processes from removing one alias address from the alias address pool. If (at block 174) there are pending processes to remove and add alias addresses to the pool 112, then control proceeds back to block 174 to wait until there are no processes pending against the alias address pool 112 and all processors have become enabled for I/O and external interrupts. Once there are no more pending processes and all processors have become enabled, then control proceeds to remove the specified alias address, which may be any alias address 112a ... 112n in the pool 112. If (at block 176) the specified alias address is the first alias address control block 112a in the pool, which is the alias address control block addressed by the pointer 110, then the operating system 5 determines (at block 178) a next alias address control block 112b pointed to by the specified alias address control block 112a, and sets (at block 180) the pointer 110 in the LSS control block 100 to the determined next alias address control block 112b. Modifying the pointers, including pointer 110 or one of the pointers in the alias address control blocks 112a ... 112n, to not point to the specified alias address removes the specified alias address from the pool 112 because it is no longer linked to in the pool 112.

If (at block 182) the specified alias address is the end alias address control block 112n, which is the alias address control block not having a pointer to another alias address control block, e.g., a null pointer, then the operating system 5 determines (at block 184) a previous alias address control block that points to the specified alias address control block and sets (at block 186) the pointer in the determined previous alias address control block to null, making the previous alias address control block the end control block to remove the specified alias address control block from the linked storage pool 112.

If (from the no branch of block 182) the specified alias address is neither the first nor end control block, e.g., neither 112b or 112$_{n-1}$, then the operating system 5 determines (at block 188) a previous alias address control block pointing to the specified alias address control block and a next alias address control block to which the specified alias address points. The previous alias address control block is modified (at block 190) to point to the next alias address control block to bypass the specified address control block to remove from the linked storage pool of alias addresses 112. After removing the control block for the specified alias address by modifying the pointer at blocks 180, 186, and 190, the operating system 5 manager 24 sets (at block 196) the indicator 108 to allow another process to initiate the operation to remove one alias address from the alias address pool.

With the described embodiments, while multiple processes attempting to obtain the first alias in the pool or to add an alias to the beginning of the pool 112 may hold the lock, each process attempting to obtain an alias must first check the access indicator 108 to ensure that the pool 112 is open. If the pool is open (access indicator 108 off), aliases may be obtained or added. If the pool 112 is closed (flag on), aliases may not be obtained. To remove an alias from anywhere in the pool, the access indicator 108, or pool closed flag, must be turned-on and the operating system must ensure that each processor is enabled to determine that no other process is removing an alias address from or adding an alias address to the pool. The process may then access the pool, locate and remove the alias address to be deleted, turn of the access indicator 108, and then reopen the pool.

In the described embodiments, the operations of FIG. 6 were performed to access the first alias address 112a in the pool. In alternative embodiments, the operations of FIG. 7 may be used access the first alias address 112a in the pool.

The described embodiments provide a technique to serialize access of a remove operation to an alias address storage pool to ensure that only one process removes an alias address at a time from the alias address storage pool and to make sure that no other process allocates that alias address while the remove request is pending by setting the access indicator 108. Further, described embodiments provide techniques to remove an alias address control block from any location in the alias address pool in order to allow hosts to remove alias addresses if necessary. A host user may want to remove alias addresses from the pool to make the alias address available for another use. This technique for removal may be needed to make alias addresses in the alias address pool available for use to address other devices.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration.

The described embodiments discuss information performed by a host operating system to remove an alias address from a pool. In additional embodiments, the operations may be performed by the control unit to manage an alias address pool for a host or host processing system.

In the described embodiments, the host included a channel subsystem program to communicate with a control unit. In alternative embodiments, the host and control unit may utilize any suitable client-server architecture and protocols known in the art to communicate and maintain information on base and alias addresses that may be assigned to a volume.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

Further, when a reference letter, such as "a", "b", or "n" is used to denote a certain number of items, the reference "a", "b" or "n" used with different elements may indicate the same or different number of such elements.

FIGS. 2, 3, 4, and 5 show information maintained in a certain format. In alternative embodiments, the information shown in these figures may be maintained in alternative data structures and formats, and in different combinations.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
assigning a plurality of alias addresses to an alias address pool, wherein the alias addresses in the alias address pool are capable of being dynamically assigned to a device to service I/O requests to the device;
initiating an operation by a process to remove a specified alias address from the alias address pool;
setting an indicator to prevent additional processes from removing one alias address from the alias address pool in response to initiating the operation; and
removing the specified alias address from the alias address pool.

2. The method of claim 1, further comprising:
completing processes pending against the alias address pool in response to setting the indicator, wherein the specified alias address is removed in response to completing the processes pending against the alias address pool.

3. The method of claim 1, wherein the specified alias address comprises any alias address assigned to the alias address pool.

4. The method of claim 1, wherein the alias addresses are represented by control blocks, wherein there is a first alias address control block, end alias address control block, and at least one intermediate alias address control block, wherein the first and at least one intermediate alias address control blocks point to a next alias address control block, and wherein the specified address comprises any of the first, the at least one intermediate, or the end alias address control block.

5. The method of claim 1, further comprising:

setting the indicator to allow processes to initiate the operation to remove one alias address from the alias address pool in response to removing the alias address from the alias address pool.

6. The method of claim 1, wherein the operations of initiating the operation, setting the indicator, and removing the specified alias address are performed by a process for which interrupts are enabled and which waits for all currently disabled processes to complete, wherein a process for which interrupts are not enabled removes an alias address in the alias address pool by performing:

initiating an operation by a process to remove the specified alias address from the alias address pool;

copying a content of the specified alias address;

reading a current content of the specified alias address;

determining whether the current content matches the copied content; and removing the specified alias address from the alias address pool in response to determining that the current and copied contents match.

7. The method of claim 4, wherein removing the specified alias address comprises:

determining a previous alias address control block pointing to the specified alias address control block and the next alias address control block to which the specified alias address points if the specified alias address is one of the at last one intermediate alias addresses; and modifying the previous alias address control block to point to the next alias address control block.

8. The method of claim 7, further comprising:

determining the next alias address control block pointed to by the specified alias address control block in response to the specified alias address being the first alias address control block;

indicating the next alias address control block as the first alias address control block in response to the specified alias address being the first alias address control block;

determining the previous alias address control block pointing to the specified alias address control block in response to the specified alias address being the end alias address control block; and modifying the previous alias address control block to not point to any alias address control block in response to the specified alias address being the end alias address control block.

* * * * *